United States Patent
Donovan et al.

(10) Patent No.: US 6,174,378 B1
(45) Date of Patent: Jan. 16, 2001

(54) PROCESS FOR PRODUCTION OF EXTRA LOW COLOR CANE SUGAR

(75) Inventors: Michael Donovan, Great Dunmow; John C. Williams, Wokingham, both of (GB)

(73) Assignee: Tate Life Industries, Limited, London (GB)

(*) Notice: Under 35 U.S.C. 154(b), the term of this patent shall be extended for 0 days.

(21) Appl. No.: 09/377,232

(22) Filed: Aug. 19, 1999

(51) Int. Cl.⁷ ............................. C13D 3/16; C13D 3/08
(52) U.S. Cl. ........................... 127/55; 127/46.2; 127/48
(58) Field of Search ............................. 127/46.2, 48, 55

(56) References Cited

U.S. PATENT DOCUMENTS

| | | |
|---|---|---|
| 1,578,463 | 3/1926 | Nicholson et al. . |
| 1,815,276 | 7/1931 | Schwieger . |
| 2,164,186 | 6/1939 | Brown et al. ........................ 127/50 |

(List continued on next page.)

FOREIGN PATENT DOCUMENTS

WO92/08810    5/1992   (WO) .

OTHER PUBLICATIONS

Nielsen et al., "Prospects and Possibilities in Application of Membrane Filtration Systems Within the Beet and Cane Sugar Industry," *Sugar Technology Reviews* 9:59–117 (1982) No Month Provided.

Kishihara et al., "Improvement of Flux in Ultrafiltration of Cane Juice," *Int. Sugar Jnl.* 85:99–102 (1983) No Month Provided.

Hanssens et al., "Ultrafiltration as an Alternative for Raw Juice Purification in the Beet Sugar Industry" (17th General Assembly of C.I.T.S., Copenhagen 1983) No Month Provided.

"Membrane Filtration," *Food Engineering* (Nov. 1987).

"Purification Using Membrane Filtration," *Sugar Journal* (Nov. 1994).

Abram et al., "Sugar Refining: Present Technology and Future Developments," *Sugar: Science and Technology*, Chapter 3, pp. 49–95 (1979) No Month Provided.

Kort, "Colour in the Sugar Industry," *Sugar: Science and Technology*, Chapter 4, pp. 97–130 (1979) No Month Provided.

Reinefeld, "Progress in the Technology of Beet–Sugar," *Sugar: Science and Technology*, Chapter 5, pp. 131–149 (1979) No Month Provided.

Chen, "Outline of Process for Manufacturing Raw Cane Sugar," *Cane Sugar Handbook*, Chapter 2, pp. 47–105, 127–186 and 526–559 (1985) No Month Provided.

Lancrenon et al., "Mineral Membranes for the Sugar Industry," *Sugar y Azucar*, pp. 40–45 (1993) No Month Provided.

Hartmann, "Lime and Carbon Dioxide Production," *Beet–Sugar Technology*, Chapter XVII, pp. 567–593 (1982) No Month Provided.

(List continued on next page.)

Primary Examiner—David Brunsman
(74) Attorney, Agent, or Firm—Williams, Morgan & Amerson, P.C.

(57) ABSTRACT

A process for purifying cane sugar from an aqueous composition thereof comprises the steps of (a) contacting an aqueous cane sugar feed composition with sufficient lime to increase the pH of the composition to at least about 9.5; (b) filtering the composition through a membrane having a pore size no greater than about 0.5 microns and having a molecular weight cutoff no less than about 5 kD, thereby producing a retentate and a permeate; and (c) contacting the permeate with sufficient carbon dioxide, or other materials designed to precipitate calcium and lower the pH, to adjust the pH to about 6.5–9.0. The feed composition preferably is cane juice, cane syrup, an aqueous composition of raw sugar, a cane sugar refinery stream, or a mixture of one or more such materials.

28 Claims, 3 Drawing Sheets

U.S. PATENT DOCUMENTS

| | | | |
|---|---|---|---|
| 2,557,800 | 6/1951 | Seailles | 127/52 |
| 2,697,049 | 12/1954 | Brieghel-Müller | 127/50 |
| 2,801,940 | 8/1957 | Stark et al. | 127/44 |
| 2,824,028 | 2/1958 | Zenzes | 127/50 |
| 2,977,253 | 3/1961 | Grandadam | 127/50 |
| 3,113,044 | 12/1963 | Alston | 127/48 |
| 3,168,419 | 2/1965 | Gale | 127/50 |
| 3,926,662 | 12/1975 | Rundell et al. | 127/48 |
| 4,115,147 | 9/1978 | Shimizu et al. | 127/54 |
| 4,328,043 | 5/1982 | Freytag et al. | 127/44 |
| 4,332,622 | 6/1982 | Hohnerlein, Jr. | 127/41 |
| 4,432,806 | 2/1984 | Madsen et al. | 127/48 |
| 4,478,645 | 10/1984 | Gudnason | 127/57 |
| 4,702,839 | 10/1987 | Koerts et al. | 210/638 |
| 4,716,044 | 12/1987 | Thomas et al. | 426/51 |
| 4,795,494 | 1/1989 | Toth et al. | 127/48 |
| 5,145,584 | 9/1992 | Swamikannu | 210/650 |
| 5,281,279 | 1/1994 | Gil et al. | 127/46.1 |
| 5,320,681 | 6/1994 | Moe et al. | 127/46.1 |
| 5,466,294 | 11/1995 | Kearney et al. | 127/42 |
| 5,468,300 | 11/1995 | Monclin | 127/43 |
| 5,468,301 | 11/1995 | Monclin | 127/43 |
| 5,480,490 | 1/1996 | Toth et al. | 127/42 |
| 5,554,227 | 9/1996 | Kwok et al. | 127/58 |
| 5,685,990 | 11/1997 | Saugmann et al. | 210/650 |
| 5,759,283 | 6/1998 | Ekern et al. | 127/42 |
| 5,865,899 * | 2/1999 | Theoleyre et al. | 127/42 |
| 5,902,408 | 5/1999 | Player et al. | 127/30 |
| 5,902,409 | 5/1999 | Kwok et al. | 127/58 |
| 6,096,136 * | 1/2000 | Saska | 127/42 |

OTHER PUBLICATIONS

Toth, "The Wescot Juice Purification System" (1989 ASSBT Meeting, New Orleans, Louisiana, Feb. 26 (Mar. 2, 1989).
"Beet Sugar Process," Western Sugar No Date Provided.
Derwent Asbtract, DD 136455 (1979) No Month Provided.
Derwent Abstract, DE 3229345 (1984) No Month Provided.
Derwent Asbtract, EP 635578 (1995) No Month Provided.
Derwent Abstract, EP 655507 (1995) No Month Provided.
Derwent Abstract, RU 2016637 (1994) No Month Provided.
Derwent Abstract, JP 5004929 (1993) No Month Provided.
Derwent Abstract, JP 6287199 (1994) No Month Provided.
Derwent Abstract, SU 1669984 (1991) No Month Provided.
Derwent Abstract, NL 8800175 (1989) No Month Provided.
Derwent Abstract, FR 2586360 (1987) No Month Provided.
Derwent Abstract, US 4999116 (1991) No Month Provided.
Derwent Abstract, US 5008254 (1991) No Month Provided.
Derwent Abstract, SU 1756817 (1992) No Month Provided.
Derwent Abstract, WO 9208810 (1992) No Month Provided.
Derwent Abstract, DD 136455 (1979) No Month Provided.

* cited by examiner

PROCESS FOR PRODUCTION OF EXTRA LOW COLOR CANE SUGAR

BACKGROUND OF THE INVENTION

The present invention relates to a process for producing cane sugar from an unpurified or partly purified aqueous cane sugar composition, such as cane juice or dissolved raw sugar from a mill.

The production of cane sugar for human consumption generally comprises two distinct operations, namely the production of raw sugar and the production of refined sugar, which are often carried out in separate locations. Production of raw sugar typically takes place at a sugar mill, which is usually located in or near sugar cane fields. In the mill sugar cane stalks are chopped into pieces and the pieces are crushed in a series of mills in order to remove the juice. The juice from the first set of roller mills is referred to as "first juice," while the total juice from all the roller mills in the process is referred to as "mixed juice." The juice is normally limed, deaerated and clarified (i.e., removal of suspended solids, usually by sedimentation). The clarified stream is referred to as "clarified juice." The juice is then evaporated to a thick syrup (known as "evaporated juice"), and crystallized in a vacuum pan. The "massecuite" (i.e., mixture of sugar syrup and crystals) produced in the vacuum pan is stirred in a crystallizer, and the mother syrup is spun off from the raw sugar crystals in a centrifugal separator. The solid sugar in the centrifugal basket is washed with water to remove remaining syrup. The solid crystalline product is termed "raw sugar."

Depending on the exact nature of the process steps and conditions used in the sugar mill, the raw sugar product can be made more or less pure. A more highly purified mill product is sometimes referred to as "Mill White" or "Plantation White" sugar. The production of these sugars requires sulphitation before or after clarification using $SO_2$ gas. It usually requires a second clarification step, usually at the syrup stage and sometimes a second sulphitation step. In nearly all cases the ash content of this sugar is much higher, perhaps by more than four times, that of refined white sugar. Although these particular mill products can be sold for human consumption without further processing in some instances, generally raw sugar must be further refined before it reaches a commercially acceptable level of purity, particularly for subsequent use by food and drink manufacturers.

Therefore, the raw sugar from a mill is usually transported to a sugar refinery for further processing. In a conventional cane sugar refining process, the raw sugar is first washed and centrifuged to remove adherent syrup, and the "affined sugar" thus produced is dissolved in water as "melter liquor." The syrup removed from the surface of the raw sugar is known as "affination syrup" and is broadly similar in composition to the mother syrup from the raw sugar crystallisation. The affination syrup is processed through vacuum pans, crystallizers and centrifugal separators similar to those used for the production of raw sugar, to recover an impure crystalline sugar product which has approximately the same composition as raw sugar. This recovered sugar product is dissolved in water, along with the affined raw sugar, to make melter liquor. Thus, the treatment of affination syrup in the recovery house of the refinery is somewhat similar to the production of raw sugar from evaporated juice.

The melter liquor is then purified, generally by the successive steps of clarification (also referred to as "defecation") and decolorization, and the resulting "fine liquor" is crystallized to give refined sugar. The clarification step usually involves forming an inorganic precipitate in the liquor, and removing the precipitate and along with it insoluble and colloidal impurities which were present in the melter liquor. In one of the clarification processes commonly used for melter liquor, termed "phosphatation," the inorganic precipitate is calcium phosphate, normally formed by the addition of lime and phosphoric acid to the liquor. The calcium phosphate precipitate is usually removed from the liquor by flotation, in association with air bubbles. Other clarification processes, termed carbonation (or carbonatation) processes, involve adding lime and carbon dioxide to the liquor, and produce calcium carbonate precipitate.

The geographical separation of cane sugar milling and refining operations results in increased overall manufacturing cost. It is not practical to build a refinery at the site of every cane sugar mill, due to the relatively large capital cost of conventional refining process equipment.

The juice produced in a cane sugar mill typically has a color of about 14,000 icu, and conventional mill technology can process this to raw sugar with a whole color of about 3,000 icu, and a well affined color of 400–800 icu. It is very difficult to produce white sugar of less than 80 icu in one crystallization in a mill because of the extremely high colors of the starting material, and because it is difficult to filter cane juice or syrup. After a crystallization at the mill, a significant portion of colored materials are concentrated in the raw sugar crystals, and therefore a high degree of decolorization is required at the refinery in order to produce white sugar.

One process that has been used in an attempt to overcome this problem is referred to as the Java process. A juice stream in a cane sugar mill is treated with an excess of lime, usually at least equal to about 10% by weight of the sugar in the juice. Excess lime is removed with carbon dioxide. This process evolved into the deHaan process, which used milk of lime and carbonation, at 55° C. The deHaan process used multiple incremental additions of milk of lime followed by carbonation. These processes did improve the color of the crystallized sugar product from the mill, but the very large amount of lime required in order to achieve good filtration made the processes economically undesirable, as well as needing a large amount of filtration equipment, and producing a large amount of material that would need to be disposed of, giving environmental problems.

There is a need for improved cane sugar processes that would allow production of is a highly purified product using a single crystallization, and preferably in a single plant, rather than in separate sugar mills and refineries, in order to reduce the cost and simplify the processing of cane sugar for human consumption.

SUMMARY OF THE INVENTION

The present invention relates to a process for purifying cane sugar from an aqueous composition thereof. The process includes the steps of (a) contacting an aqueous cane sugar feed composition with sufficient lime to increase the pH of the composition to at least about 9.5 (pHs throughout are measured at the prevailing temperature of the juices being treated); (b) filtering the composition through a membrane, preferably through a micro or ultra filtration membrane, having a pore size no greater than about 0.5 microns and having a molecular weight cutoff no less than about 5 kD, thereby producing a retentate and a permeate; and (c) contacting the permeate with a pH adjusting agent in an amount sufficient to adjust the pH to about 6.5–9.0. The feed composition preferably is cane juice, cane syrup, an aqueous composition of raw sugar, a cane sugar refinery stream, or a mixture thereof.

The pH adjusting agent can be selected, for example, from the group consisting of carbon dioxide, soda ash, phosphoric acid, sulphurous acid, and mixtures thereof. Typically this agent will also cause precipitation of insoluble calcium salts. Precipitated solid salts can be removed by a subsequent filtration, sedimentation or flocculation process; and soluble salts can be removed by a suitable de-ionization step.

In various preferred embodiments of the process, one or more of the following conditions or characteristics are used. For example, in one embodiment, the feed composition has a sucrose concentration of about 5–50° Brix. In this embodiment, the process optionally further comprises the step of heating the composition, prior to the lime contact, to a temperature of about 70–90° C. for a time no greater than about 60 minutes. For example, the composition can be heated to a temperature of about 80° C. for about 30 minutes. Another preferred process condition is performing the lime contacting of step (a) at a temperature of about 20–80° C.

One suitable method of performing the lime contacting of step (a) involves two steps. The first step comprises contacting the composition with lime in an amount up to about 4% by weight of the dry solids in the composition. The second step comprises contacting the composition with lime in an amount up to about 4% by weight of the dry solids in the composition, and also contacting the composition with materials designed to precipitate calcium and reduce the pH. Suitable materials include soda ash, phosphoric acid, sulphurous acid, and mixtures thereof. Preferably in the first step sufficient lime is used to adjust the pH to at least about 10.5–11.0, and in the second step sufficient lime is used, with carbon dioxide to adjust the pH to about 8.0–10.5. The amount of carbon dioxide will be dependent on the alkalinity of the limed juice and the final pH required, but would be in the range 1–30% by weight of the dry solids in the composition. It is especially preferred in this embodiment that the total amount of lime used in the first and second steps be about 1.0–4.0% by weight of the dry solids in the composition.

The membrane filtration of step (b) preferably is performed at about 40–90° C. The retentate from the membrane filtration of step (b) can either be treated by a further membrane filtration and/or recycled for use in a conventional raw cane sugar or cane sugar refinery process.

The pH-adjusted composition from step (c) (which reduces the pH of the membrane permeate) can be filtered at about 20–90° C., producing a filtered cane sugar juice having a sucrose concentration of about 5–50° Brix and a color of about 800–5,000 icu. Preferably, the filtered juice can be subsequently evaporated to a concentration of about 60–70° Brix, contacted with granular carbon to reduce the color to no greater than about 1,500 icu, and crystallized to yield cane sugar having color less than about 80 icu. Alternatively, the filtered syrup can be subsequently contacted with an adsorbent ion exchange resin to reduce the color to no greater than about 1,500 icu, evaporated to a concentration of about 60–70° Brix, and crystallized to yield cane sugar having color less than about 80 icu.

One specific embodiment of the invention is a process for purifying cane sugar from an aqueous composition thereof, comprising the steps of:

(a) contacting an aqueous cane sugar feed composition having a sucrose concentration of about 5–50° Brix with sufficient lime at a temperature of from about 20–80° C. to increase the pH of the composition to about 9.5–11.5;

(b) filtering the composition at a temperature of about 40–90° C. through a membrane having a pore size no greater than about 0.5 microns and having a molecular weight cutoff no less than about 5 kD, thereby producing a retentate and a permeate;

(c) contacting the permeate at a temperature of about 40–90° C. with sufficient carbon dioxide to adjust the pH to about 7.0–8.0;

(d) filtering the pH-adjusted composition at a temperature of about 40–90° C., producing a filtered cane sugar syrup having a sucrose concentration of about 5–50° Brix and a color of about 800–5,000 icu;

(e) evaporating the composition to form a concentrated composition that has a solids concentration of at least about 60° Brix; and (f) crystallizing sucrose from the concentrated composition, thereby producing cane sugar having color less than about 80 icu and less than about 0.025% by weight ash.

Another specific embodiment of the invention is a process for purifying cane sugar from an aqueous composition thereof, comprising the steps of:

(a) Optionally heating an aqueous cane sugar feed composition having a color of about 5,000–20,000 icu and a sucrose concentration of about 5–50° Brix to a temperature of about 70–90° C. for a time no greater than about 60 minutes;

(b) contacting the composition with sufficient lime at a temperature of about 20–80° C. to increase the pH of the composition to about 10.5–11.0;

(c) contacting the composition with sufficient lime and carbon dioxide at a temperature of about 20–80° C. to adjust the pH to about 8.0–10.5, where the total amount of lime used in this step and in step (b) is about 1.0–4.0% by weight of the dry solids in the composition; and the carbon dioxide is about 1 to 7% by weight of the dry solids in the composition;

(d) filtering the composition at a temperature of about 40–90° C. through a membrane having a pore size no greater than about 0.5 microns and having a molecular weight cutoff no less than about 5 kD, thereby producing a retentate and a permeate;

(e) contacting the permeate at a temperature of about 40–90° C. with sufficient carbon dioxide to adjust the pH to about 6.5–9.0; and (f) filtering the pH-adjusted composition at a temperature of about 40–90° C., producing a filtered cane sugar syrup having a sucrose concentration of about 5–50° Brix and a color of about 800–4,000 icu.

In this specific embodiment, the filtered syrup can be subsequently evaporated to a concentration of about 60–70° Brix, contacted with granular carbon to reduce the color to no greater than about 1,500 icu, and crystallized to yield cane sugar having a color of about 25–45 icu. Alternatively, the filtered syrup can be subsequently contacted with an adsorbent ion exchange resin to reduce the color to no greater than about 1,500 icu, evaporated to a concentration of about 60–70° Brix, and crystallized to yield cane sugar having a color of about 25–45 icu.

The present invention has a number of advantages over prior art cane sugar processes. The present invention can produce a refinery-quality cane sugar in a cane mill, without the need to produce raw sugar as an intermediate, or the need for two crystallizations. The present invention can also produce a product syrup from which crystals with less than about 0.025% by weight ash can be produced. The present invention also avoids the need to use the large quantities of lime required by the Java process. Further, the process produces a retentate from membrane filtration that can be recycled for use in conventional mill and/or refinery defecation processes.

DESCRIPTION OF ILLUSTRATIVE EMBODIMENTS

The feed to the process of the present invention can be any one of a variety of aqueous streams containing cane sugar, including first juice, mixed juice, clarified juice, and evaporated juice, or mixtures thereof. (The above-mentioned juices, as well as mixtures thereof are referred to generically in this patent as "cane juice.") Although the present invention is especially well adapted for use with aqueous cane juice streams found in cane sugar mills, the process can also use various sugar refinery process streams as the feed, for example a dissolved raw sugar stream.

Figure 1:
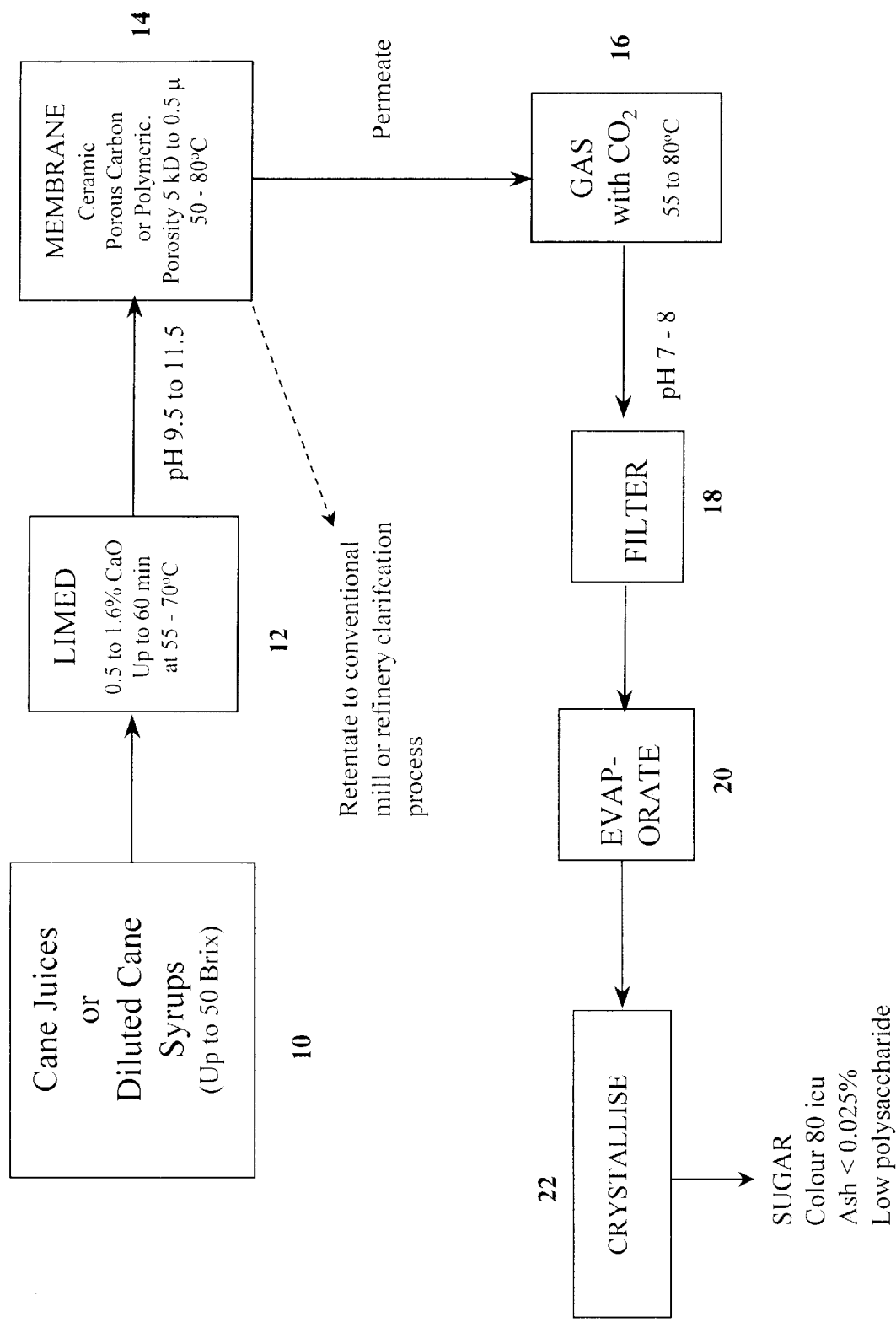
FIG. 1 is a process flow diagram for a cane sugar process of the present invention.

One embodiment of a process in accordance with the present invention is shown in FIG. 1. The feed 10 can suitably be, for example, a cane sugar juice stream from a cane sugar mill, or a cane syrup. Preferably the sucrose concentration of the feed 10 is no greater than about 50° Brix. If the feed is a syrup, dilution with water may be required to achieve the desired concentration. The feed stream is contacted 12 with lime (preferably supplied as Milk of Lime), adjusting the pH preferably to a level from about 9.5–11.5. Preferably the amount of lime used is equal to 0.5–1.6% by weight of the solids in the feed. It is also preferred that the lime contact take place at a temperature of about 55–70° C., for a time up to about 60 minutes.

Alternatively the liming step could be done using quicklime (CaO) instead of milk of lime (aqueous suspension of $Ca(OH)_2$).

The resulting pH-adjusted stream is then filtered 14 through a membrane. The membrane has a pore size no greater than about 0.5 microns. The membrane has a molecular weight cutoff no less than about 5 kD. Examples of suitable membrane types include ceramic, porous carbon, and polymeric. Suitable membranes and membrane filtration apparatus are available from Techsep, Ceramem, Koch, Patterson Candy and SCT Membralox. The filtration preferably takes place at a temperature of about 50–80° C.

The retentate from the filtration step 14 can either be further membrane treated and/or recycled for use in conventional mill and/or refinery defecation processes. The permeate from the membrane filtration step 14 is then contacted 16 with carbon dioxide gas. The amount of carbon dioxide used in this step 16 preferably is sufficient to lower the pH of the composition to about 7–8.

Optionally the composition can also be contacted with a material that will cause precipitation of calcium salts. Suitable materials for this purpose include, for example, soda ash, phosphoric acid, sulphurous acid, and mixtures thereof. Precipitated solid salts can be removed by a subsequent filtration, sedimentation or flocculation process; and soluble salts removed by a suitable de-ionization step. Optionally, adjustment of pH and precipitation of calcium salts can occur at different points in the process, including either before or after the membrane filtration, or both.

The composition is then filtered (18), optionally with the addition of filter aid. Any pressure or vacuum filter can be used, preferably with a cloth having pore size in the range 10–50 microns. The composition is then evaporated 20, preferably to a concentration of about 60–70° Brix, and then crystallized 22. The crystallized cane sugar product should have a color of about 80 icu or less, an ash level less than about 0.025% by weight, and a low polysaccharide level; e.g. about 45 ppm of starch.

Figure 2:
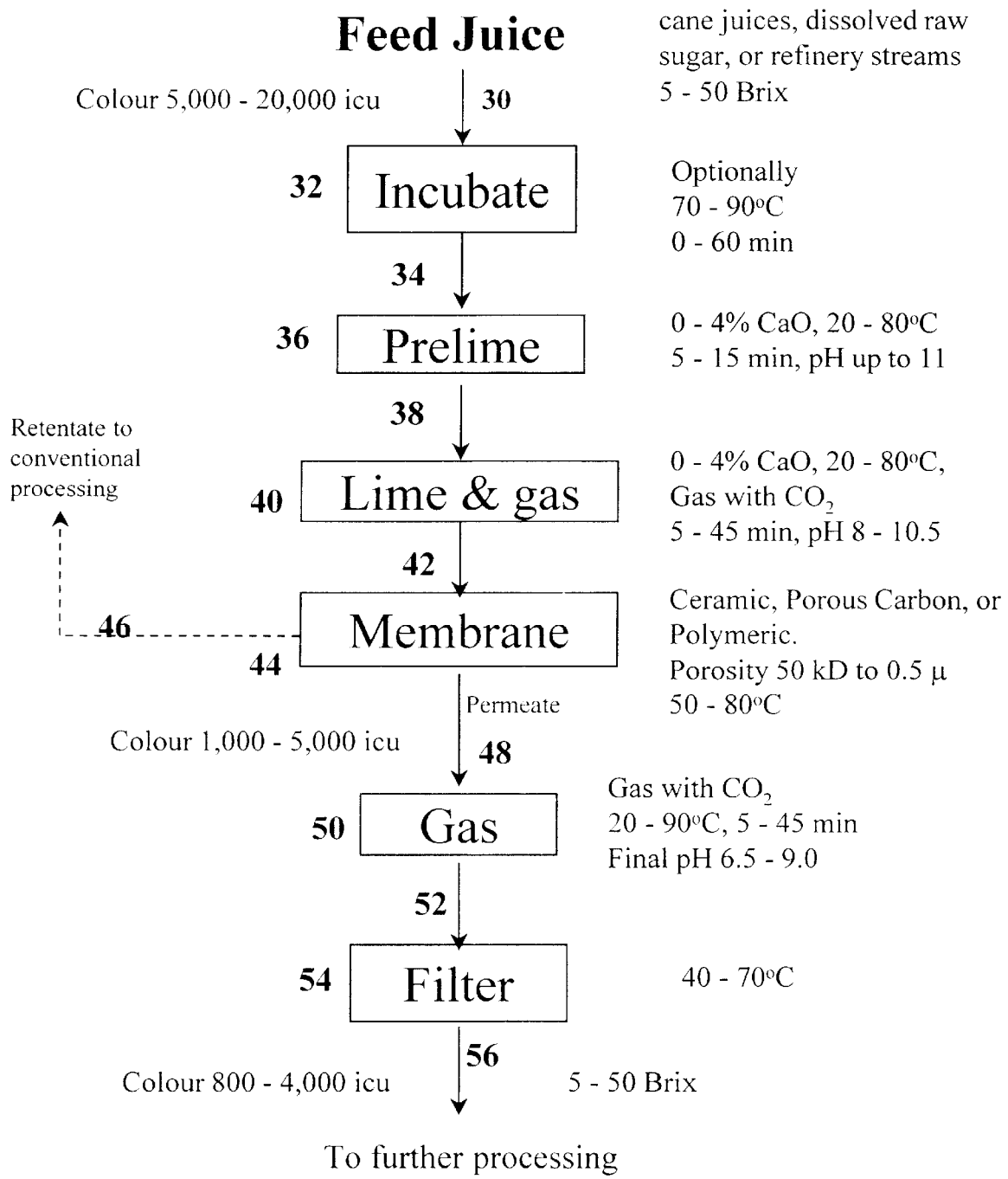
FIG. 2 is a process flow diagram for another cane sugar process of the present invention.

FIG. 2 shows another embodiment of a process in accordance with the present invention. The sucrose concentration in the feed stream (30) preferably is in the range of 5 to 50° Brix. The color of the feed will typically be from about 5,000–20,000 icu, although this should not be considered a requirement or a limitation of the scope of the invention.

Optionally the first step is incubating (32) the juice, preferably at a temperature of 70–90° C. for up to one hour to inactivate enzymes that may be present. This step can also break down enzymically formed colours, denature proteins, and improve microbial stability.

The incubated juice 34 is then contacted with lime (which may be supplied for example as milk of lime or lime saccharate). This contact can optionally be done in one or two steps. If two steps are used, the first preferably is a pre-liming step 36 and the second is a combination liming and gassing step 40. The goal is to increase the pH of the juice to within the range of about 8–10.5. Untreated cane sugar juice has a pH of about 6.5.

Liming helps precipitate impurities such as inorganic acids, organic acids, phosphates, metal ions, proteins, pectins, and coloring agents. However, high levels of lime result in degradation of invert sugars (glucose and fructose) to organic acids and coloring matters. The two stage liming and gassing can be used to provide a more gentle process, and thereby minimize such degradation.

When both a pre-liming step 36 and a lime and gas step 40 are used, it is preferred that the amount of lime added in the pre-liming step is equal to up to about 4% by weight of the solids in the juice. The pre-liming preferably takes place at about 20–80° C., for about 5–15 minutes, and raises the pH of the pre-limed juice 38 to about 9.5–11. In the lime and gas step 40, the amount of lime added to the juice can again be equal to up to about 4% by weight of the solids in the juice. The amount of carbon dioxide used is equal to about 1–15% by weight of the solids in the juice. The lime and gas step 40 preferably takes place at about 20–80° C., for about 5–45 minutes, and lowers the pH to about 8.0–10.5.

It is presently preferred to use an amount of lime in the pre-liming 36 and lime and gas 40 steps such that the total amount of lime used in the two steps combined is about 4% by weight of the solids in the juice. It is especially preferred that at least about 1 to 2% be used in each of the two steps.

The pH-adjusted juice 42 is then filtered 44 through a membrane. As mentioned above, the membrane has a pore size no greater than about 0.5 microns, and a molecular weight cutoff no less than about 5 kD. The retentate from the membrane step (44) can either be treated by a further membrane and/or recycled (46) for use in a conventional raw cane sugar or cane sugar refinery process.

The permeate at this point would typically have a color of 1,000 to 5,000 icu. The permeate 48 is then contacted 50 with carbon dioxide gas sufficient to reduce the pH to about 6.5–9.0. The amount of $CO_2$ used is preferably from about 1–5% by weight of the amount of solids in the permeate 48. The gassing preferably takes place at about 40–80° C., for about 5–45 minutes.

The stream 52 from the gas step 50 is then filtered 54, preferably at about 40–70° C. Any pressure or vacuum filter can be used, preferably with a cloth having pore size in the range 10–50 microns. Optionally a filter aid can be added. The color of the cane sugar juice at this point typically will be about 800 to 4,000 icu, and the solids level will be about 5 to 50° Brix. If the juice 56 at this point is evaporated and crystallized without further refining, it should yield a crystalline sugar with a color of about 50 to 60 icu.

Figure 3:
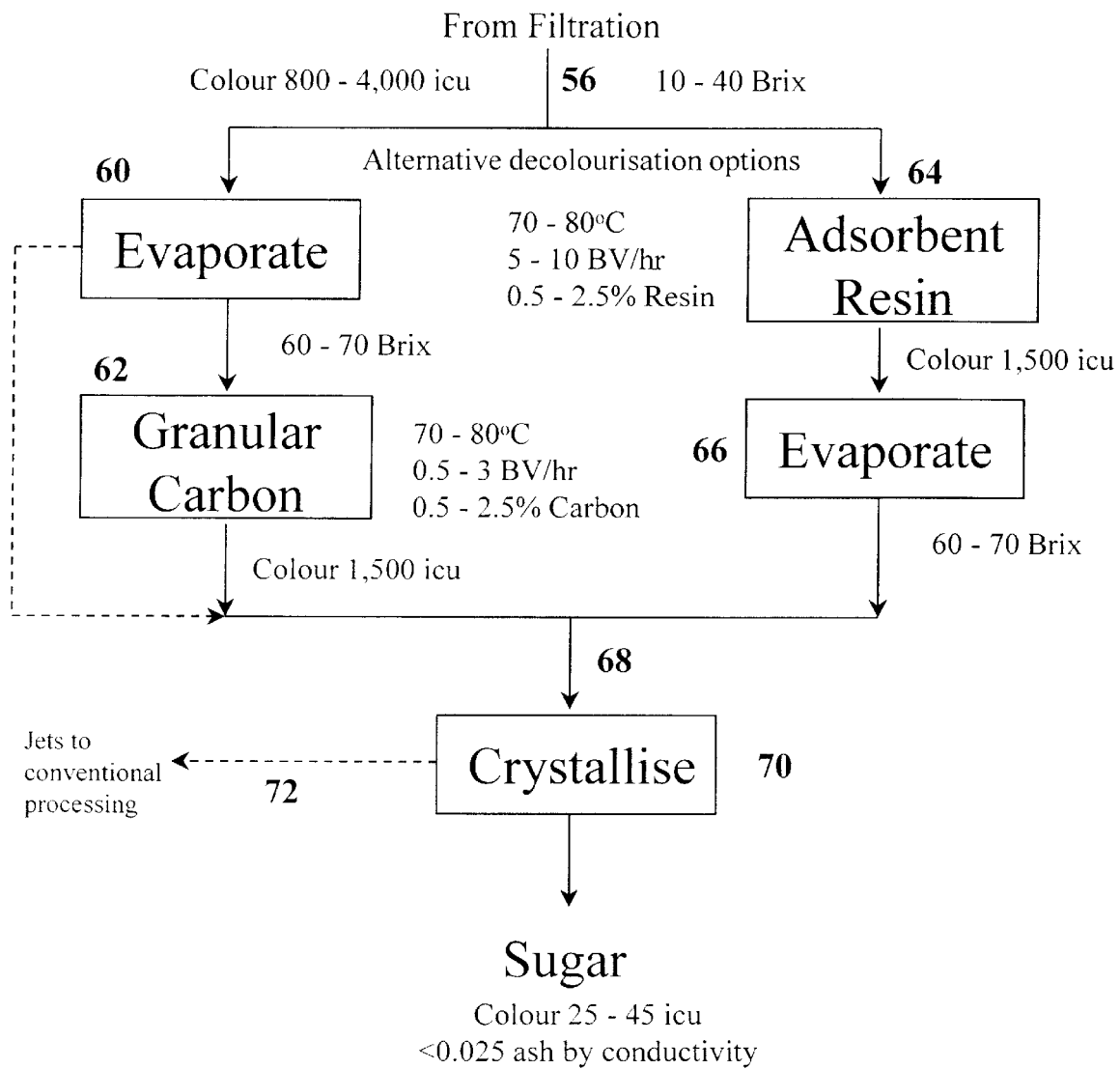
FIG. 3 is a process flow diagram for "back end" processing of cane sugar from the process of FIG. 2.

The filtered syrup 56 can be further refined, as shown in FIG. 3, by either a combination of evaporation 60 and treatment 62 with granular carbon, or by absorbent ion exchange resin (for instance Dow Optipore) 64 followed by evaporation 66. The evaporation (60 or 66) preferably produces a stream having a concentration of about 60–70° Brix. The streams leaving the granular carbon treatment 62 or the ion exchange step 64 preferably have a color no greater than about 1,500 icu. The order of these treatments is not critical and can be switched. The evaporated and treated syrup 68 is then crystallized 70 to yield a low color cane sugar, preferably having a color in the range of 25 to 45 icu, most preferably less than 35 icu. The ash content preferably is less than 0.025% by weight. The runoff or "jets" 72 from the crystallization step 70 can be used in conventional cane sugar processing.

EXAMPLES

Example 1

40.5 liters of cane factory mixed juice that had been incubated during the process at 80° C. for 30 minutes was collected. It was at 15.7 Brix, pH 5.5 and color 14,300 icu. It was cooled to 55° C. and 1.6% CaO on juice solids was added as milk of lime (which contained 100 gm CaO/liter). The pH of the limed juice was 10.9. The juice was stirred at 55° C. for 30 minutes and then treated with a Ceramem 0.2 micron ceramic membrane (LMA-0200-P) at 55° C. The input pressure was 25 psi and the output 15 psi. The membrane cross flow was 2500 liters/hr; and the flux 175 liters/$m^2$/hr. 14 liters of the permeate were collected and heated to 70° C. The pH was reduced to 7.7 (measured at 70° C.) by gassing with 12% $CO_2$ in nitrogen (at 10 liters/min) over 19 minutes. The juice was filtered under vacuum using a Whatman 54 filter paper. The color of the juice was 5,870 icu. It was evaporated to 66 Brix and then crystallized using milled sugar as a seed to give white sugar which had a well washed color of 74 icu; and ash of 0.025% on solids. The crystal contained 3 ppm of starch.

Example 2

25 liters of cane juice from the first roller mill in a cane factory ($1^{st}$ juice) was collected. It was at 22.4 Brix, and the factory produced clarified juice from this feed was at 11,485 icu. It was heated at 80° C. for 30 minutes before being cooled to 55° C. 0.8% CaO on juice solids was added as milk of lime (which contained 156 gm CaO/liter) to give a pH of 10.4. After stirring for 5 minutes at 55° C. the juice and lime suspension was gassed with pure $CO_2$ (at 4 to 5 liters/minute) to a pH of 9.7 over 5 minutes. A further 1.2% CaO on juice solids was added (also as milk of lime) over 15 minutes while gassing continued; keeping the pH constant at 9.7. The mixture was treated with a Ceramem 0.2 micron ceramic membrane (LMA-0200-P) at 55° C. The input pressure was 35 psi and the output 30 psi. The membrane cross flow was 1,900 1/hr and the flux 50 liters/$m^2$/hr. 10 liters of the permeate were collected and heated to 70° C. The pH was reduced to 8.07 by gassing with 12% $CO_2$ in nitrogen at 5 to 10 liters/minute over 10 minutes. The juice was filtered under vacuum using a Whatman 54 filter paper after adding 0.2% acid washed Super-Cel as a filter aid. The filtrate was at a color of 3230 icu. It was evaporated to 65 Brix before being crystallized using milled sugar as a seed to give white sugar which had a well-washed color of 62 icu; and ash of 0.016% on solids.

Example 3

34 liters of cane juice from the first roller mill in a cane factory ($1^{st}$ juice) was collected. It was at 19.9 Brix, and the factory produced clarified juice from this feed was at 12,647 icu. It was heated to 55° C. and 1.0% CaO on juice solids was added as milk of lime (which contained 240 gm CaO/liter) to give a pH of 10.4. After stirring for 5 minutes at 55° C. the juice and lime suspension was gassed with pure CO, (at 5 liters/minute) to a pH of 9.5 over 5 minutes. A further 1.0% CaO on juice solids was added (also as milk of lime) over 15 minutes while gassing continued; keeping the pH constant at 9.5. The mixture was heated to 70° C. and treated with a Koch polymeric membrane (S2-HFM-116-HYV; 50–100 kD). The input pressure was 45 psi and the output 37.5 psi. The membrane cross flow was 1,200 1/hr and the flux 23 liters/$m^2$/hr. 12 liters of the permeate were collected at 70° C. The pH was reduced to 8.0 by gassing with 12% $CO_2$ in nitrogen at 5 liters/minute over 8 minutes. The juice was filtered under vacuum using a Whatman 54 filter paper after adding 0.2% acid washed Super-Cel as a filter aid. The filtrate was at a colour of 3427 icu.

Example 4

30 liters of cane juice from the first roller mill in a cane factory ($1^{st}$ juice) was collected. It was at 19.6 Brix, and the factory produced clarified juice from this feed was at 10,897 icu. It was heated at 80° C. for 30 minutes before being cooled to 55° C. 1.0% CaO on juice solids was added as milk of lime (which contained 205 gm CaO/liter) to give a pH of 10.5. After stirring for 5 minutes at 55° C. the juice and lime suspension was gassed with pure $CO_2$ (at 3 to 4 liters/minute) to a pH of 9.5 over 6 minutes. A further 1.0% CaO on juice solids was added (also as milk of lime) over 15 minutes while gassing continued; keeping the pH constant at 9.5. The mixture was heated to 70° C. and treated with a Koch polymeric membrane (S2-HFM-116-HYV; 50–100 kD). The input pressure was 35 psi and the output 30 psi. The membrane cross flow was 1,300 1/hr and the flux 24 liters/$m^2$/hr. 13 liters of the permeate were collected at 70° C. The pH was reduced to 8.0 by gassing with 12% $CO_2$ in nitrogen at 5 liters/minute over 12 minutes. The juice was filtered under vacuum using a Whatman 54 filter paper after adding 0.2% acid washed Super-Cel as a filter aid. The filtrate was at a color of 3488 icu, and was evaporated to a 65 Brix syrup.

Example 5

The combined syrup from Example 4 and another similar run was passed over a small column of granular carbon such as is used in normal sugar refinery operation. The feed syrup had a color of 3680 icu and was at 60 Brix, 70° C. and running at a flow rate of 1 Bed Volume per hour. Over 15 Bed Volumes (11 kg solids per liter of carbon) an average of 67% decolourisation was achieved. Product from this run at 1195 icu was crystallized using milled sugar as a seed to give white sugar which had a well washed color of 17 icu; and an ash of 0.011% on solids.

Example 6

Juice at 20 Brix and a color of 2846 icu produced by a process similar to that described in Example 2 was run at 70° C. and 5 Bed Volumes per hour over a small column of Dow Optipore resin. Over 78 Bed Volumes (17 kg solids per liter of resin) an average of 50% decolourisation was achieved (average product color 1420 icu).

Example 7

37 liters of cane factory evaporated juice was collected. It was at 70 Brix, pH 6.3 and color 14,027 icu. It was diluted to 39 Brix, cooled to 55° C. and 1.2% CaO on juice solids was added as milk of lime (which contained 55 gm CaO/liter). The pH of the limed juice was 10.7. The juice was stirred at 55° C. for 30 minutes and then treated with a Ceramem 0.2 micron ceramic membrane (LMA-0200-P) at 55° C. The input pressure was 40 psi and the output 30 psi. The membrane flux was 42 liters/m$^2$/hr. 10 liters of the permeate were collected and heated to 70° C. The pH was reduced to 7.9 (measured at 70° C.) by gassing with 12% $CO_2$ in nitrogen (at 10 liters/min) over 18 minutes. The juice was filtered under vacuum using a Whatman 54 filter paper. The color of the juice was 7,832 icu. It was evaporated to 66 Brix and then crystallized using milled sugar as a seed to give sugar which had a well-washed color of 61 icu; and ash of 0.014% on solids.

Example 8

40 liters of cane factory mixed juice that had been incubated during the process at 80° C. for 30 minutes was collected. It was at 16.5 Brix, pH 5.5 and color 12,100 icu. It was cooled to 55° C. and 1.2% CaO on juice solids was added as milk of lime (which contained 87 gm CaO/liter). The pH of the limed juice was 10.8. The juice was stirred at 55° C. for 30 minutes and then treated with a Ceramem 0.2 micron ceramic membrane (LMA-0200-P) at 55° C. The input pressure was 25 psi and the output 15 psi. The membrane flux was 200 liters/m$^2$/hr. 24 liters of the permeate were collected and heated to 70° C. 17% phosphoric acid (88 ml) was added to reduce the pH to 7.0 (measured at 70° C.). A standard sugar mill flocculant was added and a clear juice produced by settling. The color of the juice was 5,305 icu. It was evaporated to 71 Brix and then crystallized using milled sugar as a seed to give white sugar which had a well washed color of 82 icu.

Example 9

A cane sugar refinery affination syrup at 73 Brix was diluted to give 40 liters of 42.5 Brix juice at a color of 21,000 icu. It was heated to 50° C. and 0.7% lime on solids added as milk of lime (260 gms CaO per liter). A pH of 10.7 was reached which was held for 10 minutes. The pH was reduced to 9.75 by gassing with pure $CO_2$ at 14 liters/minute. The pH was maintained at 9.75 by adding a further 1.3% lime (as milk of lime) while continuing to gas at the same rate. The addition of the rest of the lime took 66 minutes. The product was treated with a Ceramem 0.2 micron ceramic membrane (LMA-0200-P) at 55° C. The input pressure was 27 psi and the output 15 psi. The membrane flux averaged 43 liters/m$^2$/hr. 10 liters of the permeate were collected and heated to 70° C. and the pH was reduced to 8.0 by gassing with pure $CO_2$ (at 3 liters/min). The juice was filtered under vacuum using a Whatman 54 filter paper. The color of the juice was 7,184 icu.

A variety of other process steps, materials, and equipment suitable for use in purification of cane sugar are known in the art, and can be used in conjunction with or as part of the present invention. The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A process for purifying cane sugar from an aqueous composition thereof, comprising the steps of:
   a. contacting an aqueous cane sugar feed composition with sufficient lime to increase the pH of the composition to at least about 9.5;
   b. filtering the composition through a membrane having a pore size no greater than about 0.5 microns and having a molecular weight cutoff no less than about 5 kD, thereby producing a retentate and a permeate; and
   c. contacting the permeate with a pH adjusting agent in an amount sufficient to adjust the pH to about 6.5–9.0.

2. The process of claim 1, where the feed composition is selected from the group consisting of cane juice, cane syrup, aqueous compositions of raw sugar, cane sugar refinery streams, and mixtures thereof.

3. The process of claim 1, where the feed composition has a sucrose concentration of about 5–50° Brix.

4. The process of claim 1, further comprising the step of heating the composition, prior to the lime contact, to a temperature of about 70–90° C. for a time no greater than about 60 minutes.

5. The process of claim 1, wherein the lime contacting of step (a) is conducted at a temperature of about 20–80° C.

6. The process of claim 1, where the amount of lime used in step (a) is up to about 4% by weight of the dry solids in the composition.

7. The process of claim 6, where sufficient lime is used to adjust the PH to at least about 10.5.

8. The process of claim 1, where the lime contacting of step (a) is performed in two steps:
   the first step comprising contacting the composition with lime in an amount up to about 4% by weight of the dry solids in the composition; and
   the second step comprising contacting the composition with lime in an amount up to about 4% by weight of the dry solids in the composition and further contacting the composition with carbon dioxide in an amount equal to about 1–30% by weight of the dry solids in the composition.

9. The process of claim 8, where in the first step sufficient lime is used to adjust the pH to at least about 10.5, and in the second step sufficient lime and carbon dioxide are used to adjust the pH to about 8.0–10.5.

10. The process of claim 8, where the total amount of lime used in the first and second steps is about 1.0–4.0% by weight of the dry solids in the composition.

11. The process of claim 1, where the membrane filtration of step (b) is performed at about 40–90° C.

12. The process of claim 1, where the retentate from the membrane filtration of step (b) is further membrane treated.

13. The process of claim 1, where the retentate from the membrane filtration of step (b) is recycled for use in a conventional raw cane sugar production process or cane sugar refining process.

14. The process of claim 1, where the pH adjusting agent is selected from the group consisting of carbon dioxide, soda ash, phosphoric acid, sulphurous acid, and mixtures thereof.

15. The process of claim 14, where the pH adjustment of step (c) results in precipitation of calcium salts.

16. The process of claim 15, where the precipitate is removed by filtration, sedimentation, flocculation, or a combination thereof.

17. The process of claim 1, where the pH-adjusted composition from step (c) is filtered at about 20–90° C., producing a filtered cane sugar juice having a sucrose concentration of about 5–50° Brix and a color of about 800–5,000 icu.

18. The process of claim 17, where the filtered syrup is subsequently evaporated to a concentration of about 60–70° Brix, contacted with granular carbon to reduce the color to no greater than about 1,500 icu, and crystallized to yield cane sugar having color less than about 80 icu.

19. The process of claim 17, where the filtered syrup is subsequently contacted with an adsorbent ion exchange resin to reduce the color to no greater than about 1,500 icu, evaporated to a concentration of about 60–70° Brix, and crystallized to yield cane sugar having color less than about 80 icu.

20. A process for purifying cane sugar from an aqueous composition thereof, comprising the steps of:
   a. contacting an aqueous cane sugar feed composition having a sucrose concentration of about 5–50° Brix with sufficient lime at a temperature of from about 20–80° C. to increase the pH of the composition to about 9.5–11.5;
   b. filtering the composition at a temperature of about 40–90° C. through a membrane having a pore size no greater than about 0.5 microns and having a molecular weight cutoff no less than about 5 kD, thereby producing a retentate and a permeate;
   c. contacting the permeate at a temperature of about 40–80° C. with sufficient carbon dioxide to adjust the pH to about 7.0–8.0;
   d. filtering the pH-adjusted composition at a temperature of about 40–80° C., producing a filtered cane sugar syrup having a sucrose concentration of about 5–50° Brix and a color of about 3000–6,000 icu;
   e. evaporating the composition to form a concentrated composition that has a solids concentration of at least about 60° Brix; and
   f. crystallizing sucrose from the concentrated composition, thereby producing cane sugar having color less than about 80 icu and less than about 0.025% by weight ash.

21. A process for purifying cane sugar from an aqueous composition thereof, comprising the steps of:
   a. contacting an aqueous cane sugar feed composition having a color of about 5,000–20,000 icu and a sucrose concentration of about 5–50° Brix with sufficient lime at a temperature of about 20–80° C. to increase the pH of the composition to about 10.5–11.5;
   b. contacting the composition with sufficient lime and carbon dioxide at a temperature of about 20–80° C. to adjust the pH to about 8.0–10.5, where the total amount of lime used in this step and in step (a) is about 1.0–4.0% by weight of the dry solids in the composition;
   c. filtering the composition at a temperature of about 40–90° C. through a membrane having a pore size no greater than about 0.5 microns and having a molecular weight cutoff no less than about 5 kD, thereby producing a retentate and a permeate;
   d. contacting the permeate at a temperature of about 40–80° C. with sufficient carbon dioxide to adjust the pH to about 6.5–9.0; and
   e. filtering the pH-adjusted composition at a temperature of about 40–80° C., producing a filtered cane sugar juice having a sucrose concentration of about 5–50° Brix and a color of about 800–4,000 icu.

22. The process of claim 21 where the composition produced in step (a) is treated with lime and with a further pH adjusting agent to reduce the pH and to precipitate calcium salts.

23. The process of claim 22, where the pH adjusting agent is selected from the group consisting of phosphoric acid, sulphurous acid, and mixtures thereof.

24. The process of claim 21 where the permeate from step (c) is contacted at a temperature of about 40–80° C. with a pH adjusting agent in an amount sufficient to reduce the pH to about 6.5–9.0 and precipitate calcium salts.

25. The process of claim 24, where the pH adjusting agent is selected from the group consisting of soda ash, phosphoric acid, sulphurous acid, and mixtures thereof.

26. The process of claim 24, where the precipitate is removed by filtration, sedimentation, flocculation, or a combination thereof.

27. The process of claim 24, where the filtered juice produced in step (e) is subsequently evaporated to a concentration of about 60–70° Brix, contacted with granular carbon to reduce the color to no greater than about 1,500 icu, and crystallized to yield cane sugar having a color of about 25–45 icu.

28. The process of claim 21, where the filtered juice produced in step (e) is subsequently contacted with an adsorbent ion exchange resin to reduce the color to no greater than about 1,500 icu, evaporated to a concentration of about 60–70° Brix, and crystallized to yield cane sugar having a color of about 25–45 icu.

* * * * *

UNITED STATES PATENT AND TRADEMARK OFFICE
CERTIFICATE OF CORRECTION

PATENT NO. : 6,174,378
DATED : JANUARY 16, 2001
INVENTOR(S) : MICHAEL DONOVAN/JOHN C. WILLIAMS

It is certified that error appears in the above-identified patent and that said Letters Patent is hereby corrected as shown below:

ON THE TITLE PAGE

Item [73] Assignee should read -- Tate & Lyle Industries, Limited.

In claim 7, line 2, delete "PH" and insert therefor --pH--.

Signed and Sealed this

Fifteenth Day of May, 2001

*Attest:*

NICHOLAS P. GODICI

*Attesting Officer*      *Acting Director of the United States Patent and Trademark Office*